United States Patent [19]

Mirman

[11] 3,994,079

[45] Nov. 30, 1976

[54] DISPLAY DEVICE, PARTICULARLY SUITABLE FOR INTERIOR DESIGNS

[75] Inventor: Simone Mirman, London, England

[73] Assignee: Simone Mirman Limited, London, England

[22] Filed: Mar. 31, 1975

[21] Appl. No.: 565,740

[52] U.S. Cl. ............................. 35/53; 35/7 A
[51] Int. Cl.² ............................. G09B 25/00
[58] Field of Search ............... 35/7 A, 53; 40/142 A

[56] References Cited
UNITED STATES PATENTS

| | | | |
|---|---|---|---|
| 1,832,750 | 11/1931 | Stephens | 35/53 |
| 2,319,200 | 5/1943 | Bedell | 35/53 |
| 2,761,413 | 9/1956 | Breer | 40/142 A X |
| 2,941,314 | 6/1960 | Schwieger | 35/53 |
| 3,205,594 | 9/1965 | Gilbert | 35/53 |
| 3,659,353 | 5/1972 | D'Agrosa | 35/7 A X |
| 3,755,938 | 9/1973 | Bytwork | 35/7 A X |
| 3,896,565 | 7/1975 | Quinn | 35/7 A X |

FOREIGN PATENTS OR APPLICATIONS

| | | | |
|---|---|---|---|
| 226,174 | 12/1959 | Australia | 35/53 |
| 1,506,190 | 11/1967 | France | 35/7 A |
| 959,759 | 6/1964 | United Kingdom | 35/53 |
| 979,358 | 1/1965 | United Kingdom | 35/7 A |
| 1,144,235 | 3/1969 | United Kingdom | 35/53 |

*Primary Examiner*—Harland S. Skogquist
*Attorney, Agent, or Firm*—Baldwin, Wight & Brown

[57] ABSTRACT

A display device for portraying a scene having a foreground and a background, comprising a base board, one or more background replicas, shaped and designed to fit onto the base board and to represent a background, and one or more foreground replicas, each of the replicas being interchangeable with alternative designs of replicas, and wherein the replicas are arranged to be magnetically attached to the base board.

15 Claims, 4 Drawing Figures

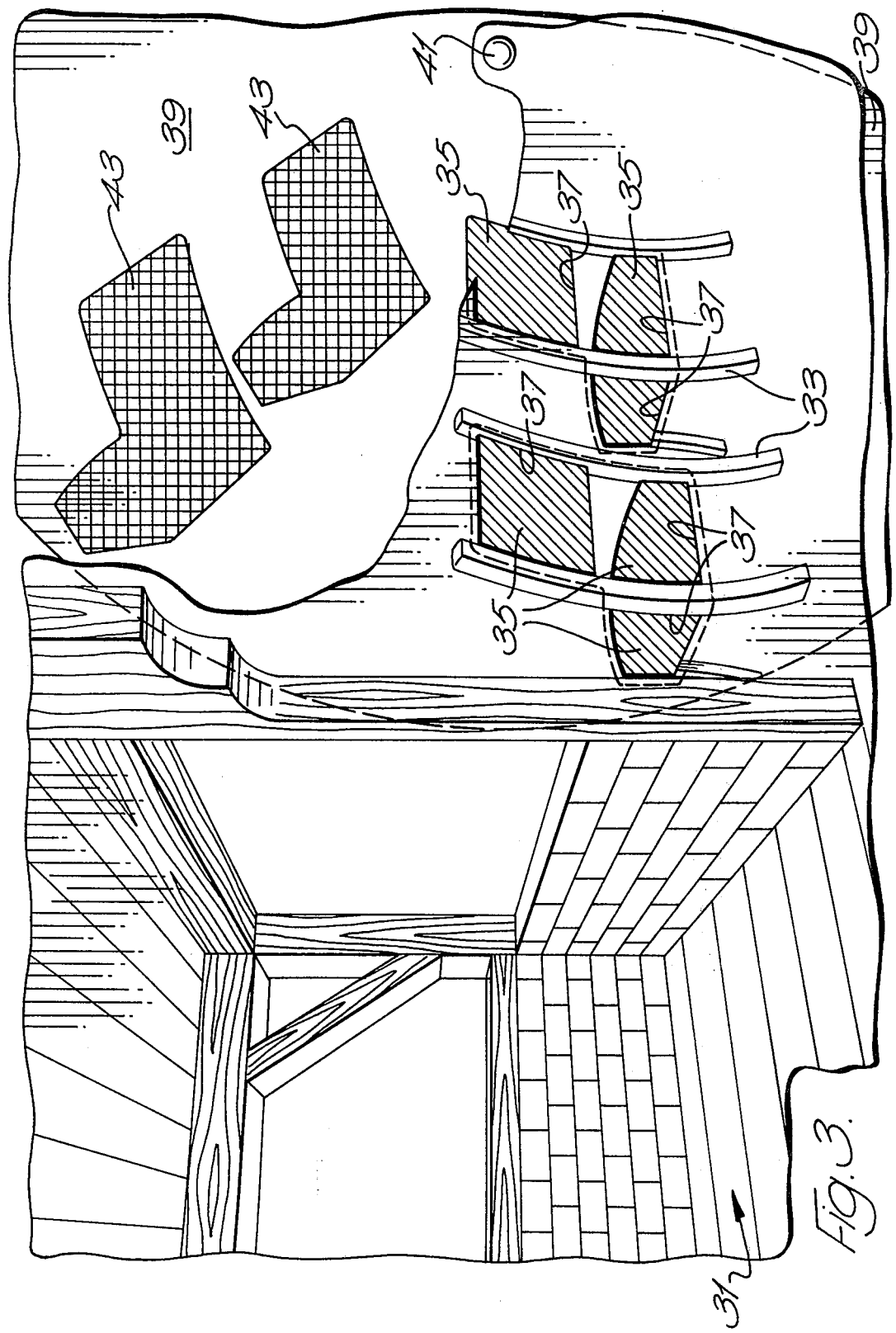

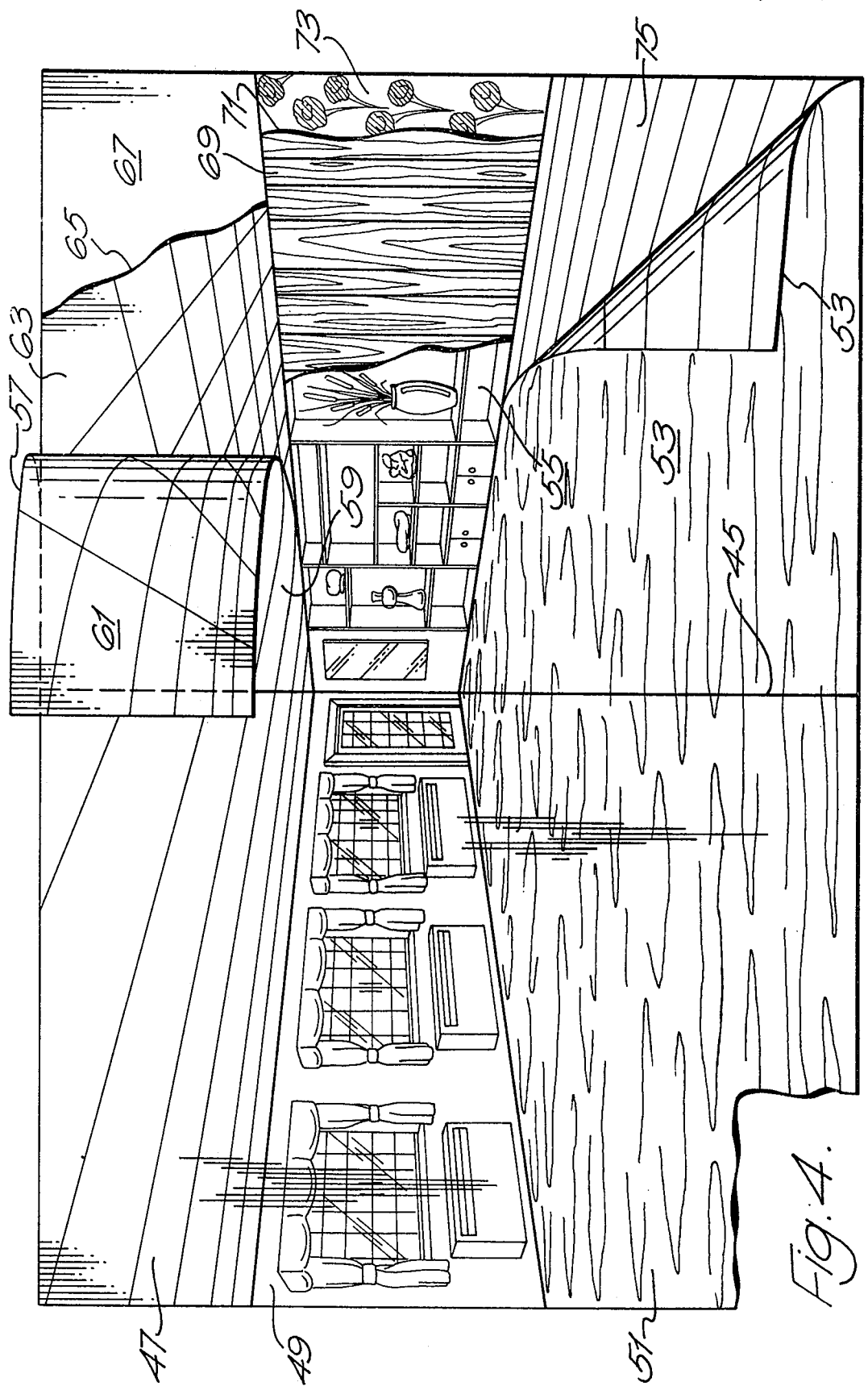

DISPLAY DEVICE, PARTICULARLY SUITABLE FOR INTERIOR DESIGNS

This invention relates to a display device for portraying different interior design schemes for hotel rooms, bars or the like. The invention also relates to a kit of parts for making up such a display device.

When an interior designer is asked to design the interior of a room, it is of considerable benefit to the customer if the designer can show to the customer several alternative designs in quick succession without having to prepare a large number of separate drawings and without necessarily departing from the previous theme. For example, if the color of the wallpaper or floor covering or curtains, or a style of furniture can be changed without altering the remainder of the room, this can save considerable time. The present invention seeks to provide a display device capable of meeting these requirements.

According to the present invention, I provide a display device for portraying a scene having a foreground and a background, comprising a base board, one or more background replicas, shaped and designed to fit onto the base board and to represent a background, and one or more foreground replicas, each of the replicas being interchangeable with alternative designs of replicas, and wherein the replicas are arranged to be magnetically attached to the base board.

Preferably, the base board has a surface formed of magnetised rubbery material and at least a part of the backing of the replicas is ferromagnetically metallic, e.g., thin ferromagnetic metal foil patches or strips are secured to the rear surface of the replicas. Reference hereinafter in the description to "metal" or "metallic" is to be taken to means ferromagnetic metal or ferromagnetic metallic.

Preferably, the or each background replica(s) is/are room replica(s) to represent the basic shape, design and decor of a particular room and the foreground replica(s) represent(s) the furniture and/or furnishings within the room.

In one form, the various replicas can all be connected together in the form of a book having multi-leafed "pages," i.e., there could be an upper series of leaves representing the ceiling design and associated lighting for a room, a central series of leaves representing wall designs, window designs, curtain design and the like, and a lower series of leaves representing the design of floor coverings, furniture and the like. By having several different series in the same book, a very large selection of design replicas can be viewed, merely by flipping over the leaves until the right combination is formed. With this arrangement, the "cover" of the book would be capable of being magnetically attached to the base board and each leaf could have metal strip around its edges to enable it to be held in position as required on the base board.

If the replicas are in book form, it would be normal, once the customer had chosen a basic design, for the designer then to prepare a completely new replica of that basic design, so that the customer could then experiment with different furnishing replicas.

In one construction, the room replica could be a one-piece representation of a room, illustrating all the furnishings with the exception, for example, of a set of chairs for a restaurant. In order to enable the customer to choose the style or color of the chairs, a plurality of apertures would be left in the replica at the chair locations, and by providing a rotatable card or the like behind these apertures, suitably marked with a series of sets of replicas of the chairs, the card can be rotated a few degrees to change from one series in one style or color of chair at each aperture, to another series in a different style or color.

In another arrangement, however, the background replicas are adapted to fit together like a jig-saw puzzle to represent the basic shape, design and decor off a particular room and the foreground replica(s) represent the furniture and/or furnishings within the room. The room replicas are usually two-dimensional and when assembled together form a perspective view of the interior of the room.

In this other arrangement, or even in the other constructions described, it is preferred that several locating apertures are provided in the room replicas at those locations where a furnishing replica representing an article of furniture and/or a fitting is to be located, and that the rear surface of the furnishing replica is provided with a projection of similar configuration to its aperture so that the furnishing replica can be immmediately correctly located to give the correct design.

In order to give a more effective three-dimensional effect, the furniture replicas preferably have a thick projection on their rear surfaces so that they stand proud of the base board. This thickness of the projection is preferably proportioned to the size of the replica, i.e., a large sofa replica would have a thicker projection than a replica of a small chair.

The base board may be of rectangular configuration and the various room replicas may be made up from sheet-like material, e.g., card, card-backed textile material or the like, suitably colored, shaped and textured to represent the walls of a room, windows, fireplaces, mantelpieces, curtains, floor coverings, ceilings and the like, each different article being represented by a separate replica of the desired shape and color or a plurality of articles represented by a single replica. Thus, for example, if the proposed design of the room is to incorporate a green colored wallpaper there could be a replica of the walls of the room designed in perspective and shaped and colored to represent the exact color of the wallpaper and similar replicas representing the ceiling and the floor covering, curtains, windows and the like will be located on the base board, e.g., after the manner of a jig-saw puzzle or using the "book" principle, so as accurately to represent the final design of the room.

If a hotel bedroom is being portrayed, for example, suitable apertures would be provided in the replica of the floor covering in the region of the proposed location of the beds for the room, whether they be twin beds or a double bed. The replicas of the beds would likewise be made of sheet material shaped and colored so as accurately to represent the actual beds, the back of these replicas being provided with one or more projections made either of increased or of the same thickness of material as that of the floor covering, arranged to form a snug fit within the aperture in the floor covering, the precise location of the projections being prearranged so that in the final design portrayed by the display device, the bed replica will be exactly corrrectly located.

Preferably, for replicas of large articles of furniture, two apertures and two projections are provided so that in the final design the bed or like article can be correctly orientated, in accordance with predetermined arrangements.

It will thus be appreciated that when the interior designer wishes to demonstrate his designs to his customer, he merely builds up a picture of the proposed room on the base board from the various replicas and places the furniture replicas for the room in position with the aid of the apertures. If the customer does not like the wall covering, this can merely be peeled away from the base board and replaced with an alternative replica wall covering of exactly the same shape but different design or color. Likewise, if the customer does not approve of the style or color of furniture shown in the room, the original replica can be removed from the floor covering and an alternative style or color replica can replace it immediately by locating it in the correct position with the aid of the projections located on its rear surface.

Although it is preferred that the base board be made of magnetic material and the replicas have a metallic backing, it will be appreciated that equally good results could be obtained with a metallic base board and magnetic replicas or magnetic replicas and a magnetic base board.

If desired, the base board may be adapted for hanging on a wall or a rail.

Although the above display device is intended primarily for the use of interior designers, it will be appreciated that it could have considerable utility in department stores and the like to enable customers to design their own furnishings without having continually to travel back and forth between various store departments selling floor coverings, chair covers, wallpapers and the like. Equally, it is envisaged that the device could be adapted for use by architects when planning housing schemes and the like. In this case, of course, the "room" replicas would represent general background scenes, and the "furniture" replicas would represent houses, trees, footpaths and the like, which the architect was actually designing.

Very often, when this invention is being used for illustrating proposed interior designs for hotel rooms and the like, the demonstrator will want to move the various furniture replicas around on the base board. Obviously, if these replicas have been drawn to scale and in the correct perspective for a particular position, that perspective will be slightly incorrect once the position is changed. To overcome this problem, therefore, the bases of the various replicas are pivotably attached to the remainder of the replica so that their angular position can be slightly altered. Obviously, if the chair has legs, all the legs would be capable of being swung relative to the remainder of the chair. Alternatively, if the replica was of an armchair, then it would be the lower portion of the chair and in particular its bottom edge which would be pivotable relative to the remainder.

The invention is now described with reference to the accompanying drawings, in which:

FIG. 3 is a scrap front elevation of one alternative embodiment of the invention, and FIG. 4 is a front elevational view of a further feature of the invention.

Figures 1, 2:
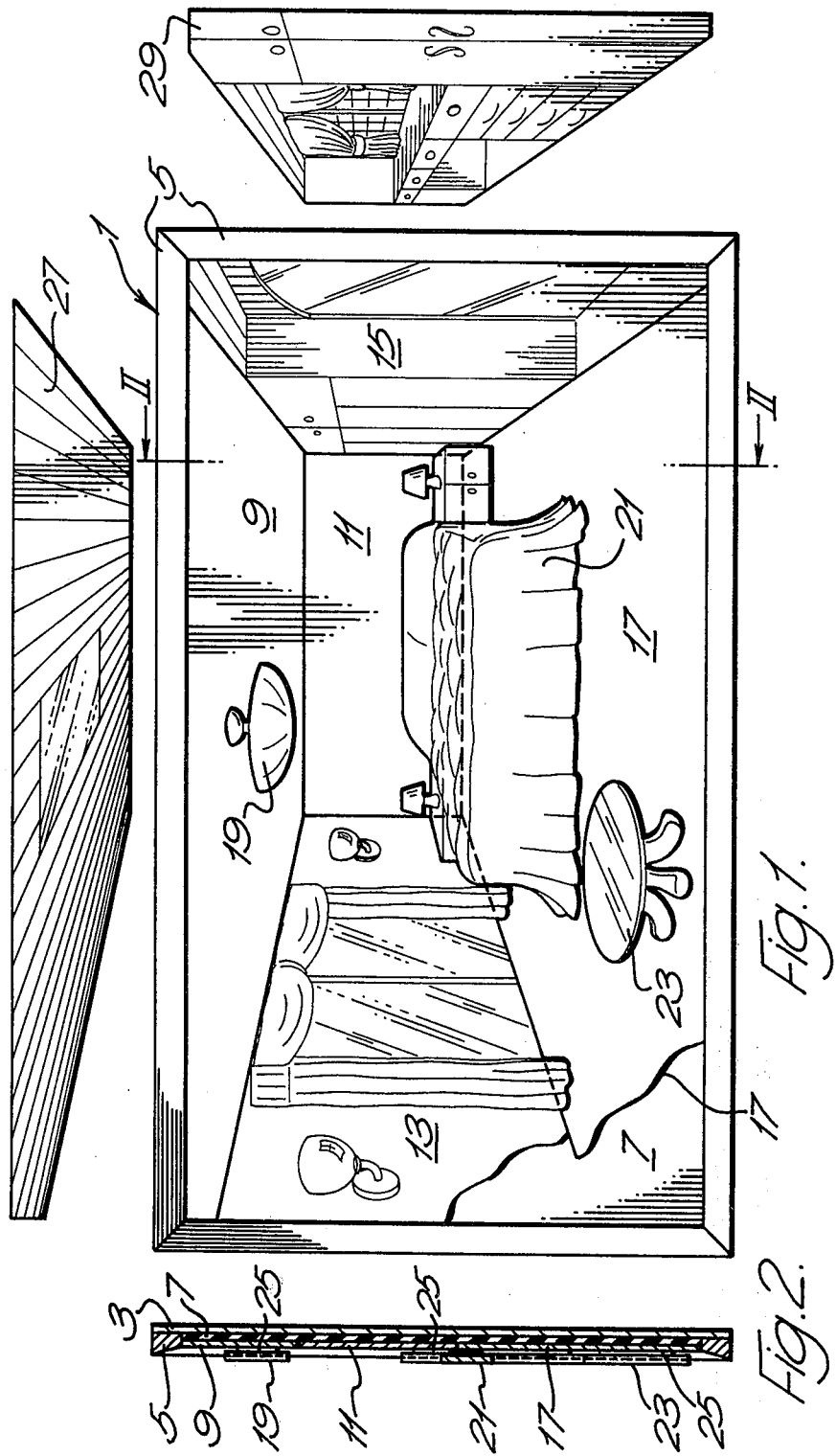
FIG. 1 is a front elevation of a display device showing in perspective a representation of the interior decor of a bedroom and incorporating a base board.
FIG. 2 is a section on the line II—II of FIG. 1.

Referring to FIG. 1, the display device shown therein includes a base board indicated generally at 1 having a flat base 3 surrounded by a frame 5 and supporting a rubbery magnetic material 7. A plurality of background replicas, each designed to represent the various parts of a bedroom, are shown magnetically attached to the material 7. A background replica 9 represents the ceiling of the room, a replica 11 represents the end wall, a replica 13 represents the left hand wall together with its light fittings and curtains, a replica 15 represents the right hand wall which is fitted out with cupboards and a mirror, and a replica 17 represents the floor. The replicas 9, 11 and 17 can clearly be seen in FIG. 2 and these are easiest attached to the material 7 by applying a layer of ferrous metallic foil to their rear surfaces (the foil is not shown in the drawings). Superimposed on the background replicas are several foreground replicas, i.e., a light fitting 19, a double bed with bedside tables 21 and an occasional table 23. So that they stand out in perspective, each of the foreground replicas is spaced from the background replicas by one or more spacer discs 25, which discs have a ferrous metallic surface so that they are attracted by the rubberized magnetic material 7.

As will be apparent from the lower left hand corner of FIG. 1, if the various furnishing replicas in the room do not appeal to a prospective customer, they are merely removed and replaced by replicas of the same shape but a different design. For example, the ceiling replica 9 can be replaced by an entirely different replica 27 and the right hand wall replica 15 can be replaced by an entirely different wall replica 29.

Referring now to FIG. 3, a portion of a background replica 31 is illustrated, the replica being made of card or other flexible sheet material suitably designed to represent, for example, a hotel bar. Marked on the foreground replica 31 are the outlines of two upstanding chairs 33 upholstered in a particular patterned material 35. The upholstery pattern 35 is shown through windows 37 formed in the replica 31, several alternative patterns 35, 43 being painted or printed upon a further sheet or disc of material 39 arranged behind the material of the replica 31 and rotatable relative to it about an axis 41. By rotating the disc 39 relative to the material 31, so the various different patterns 35, 43, etc., can be brought into registry with the windows 37, thereby enabling instant changes in the upholstery of the chairs 33. It will of course be appreciated that the replica 31 and its attached rotatable disc 39 is provided with a suitable backing to enable the replica to be magnetically attached to the material 7 of the base board as with the FIG. 1 embodiment.

Referring now to FIG. 4, there is shown therein various background replicas for a room in the form of a multi-leafed booklet having leaves which themselves are attracted by magnetism to the material 7 of the base board. This can be achieved in any known manner. As can be seen, the booklet has a central spine, or hinge line 45 and the leaves are arranged in matching facing pairs printed or painted on both sides. Referring to the left hand side of the Figure, an upper leaf 47 is designed to provide a ceiling replica, a central leaf 49 to provide a left hand wall replica, and a lower leaf 51 to provide a floor covering replica. To the right hand side of the spine 45 there is a lower leaf 53 illustrating a floor surface to match that of the leaf 51, a central leaf 55 providing a wall complementary to the wall shown on the leaf 49 and an upper leaf 57 showing a ceiling 59 matching the ceiling of the leaf 47. If the particular design of ceiling illustrated does not appeal to the customer, it is merely necessary for the demonstrator to flip over the leaf 57 as though he was turning over the page of a book, thus presenting a different ceiling surface 61, e.g., of square ceiling tiles. Merely by turning over one leaf the whole ceiling can be changed. A portion of the subsequent leaf 63 is shown cut away at 65 to illustrate a yet further construction of ceiling 67. Likewise, the different constructions of wall can be changed merely by flipping over the leaf 55, for example so as to present a panelled wall 69 or by flipping over the next leaf 71 to show wallpaper 73. In a similar manner the lower leaf 53 can be flipped over to illustrate an alternative floor surface, e.g., boards 75.

What I claim is:

1. A display device for portraying a three-dimensional scene having a foreground and a background, said display device comprising a base board; at least two background replicas, shaped, designed and colored to fit together in cooperative relation and onto the base board and to represent in full perspective a background; one part of said background being represented by one of said replicas and another part of said background by the other of said replicas; at least one foreground replica; and interchangeable foreground and background replicas with alternative designs and color of said foreground and background replicas, respectively, for replacing each of said foreground and background replicas; all of said replicas have mounting means cooperative with said base board for magnetically attaching each of said replicas to said base board; and each foreground replica including means for mounting said foreground replicas in spaced and overlying relation to said background replicas to give a three-dimensional effect.

2. A display device according to claim 1 in which the base board has a surface formed of magnetized rubber-like material and said mounting means include at least a part of the backing of each replica being ferrromagnetically metallic.

3. A display device according to claim 1 in which each background replica is designed to represent part of a room selectively including a ceiling, wall and floor and wherein each foreground replica selectively represent furniture and furnishings within the room.

4. A display device as claimed in claim 1 wherein the background replica and foreground replica are formed in one piece for attachment to the base board to represent a room and wherein a plurality of locating apertures are left in the room at those locations where further foreground replicas are to be located, and there being a rotatable card and the like arranged behind the locating apertures and suitably marked with a series of sets of replicas of furnishings, where, upon rotation of the card, furnishing replicas of different designs can be presented at the apertures.

5. A display device as claimed in claim 1 wherein the background replicas fit together to represent the basic shape, design and decor of a particular room scene, and wherein the foreground replicas represent furnishings within the room scene.

6. A display device according to claim 1 in which the base board is of rectangular configuration and sets of replicas made up from sheet-like material are provided in a variety of desired colors and textures.

7. A display device according to claim 1 wherein at least one of the foreground replicas has a base portion pivotally attached to the remainder of that foreground replica.

8. A display device as claimed in claim 1 wherein components thereof are supplied as a kit of interchangeable cooperating parts.

9. A display device as claimed in claim 7 wherein said background replicas include a plurality of background replicas connected together in the form of a book having multileafed pages and a cover, and said cover having means capable of magnetically attracting the pages of the book so that each leaf is capable of being held magnetically in a selected position.

10. A display device as claimed in claim 9 wherein the book has an upper series of leaves representing a ceiling design and associated lighting for a room; a central series of leaves representing wall designs, window designs, curtain designs and the like; and a lower series of leaves representing the design of floor covers, furniture and the like.

11. A display device as claimed in claim 9 wherein said book has a single centrally located hinge line.

12. A display device as claimed in claim 1 wherein several locating apertures are provided in the background replicas at those locations where a foreground replica representing a furnishing is to be located and wherein the rear surface of the foreground replica is provided with a projection of a similar configuration to each aperture for location in one of said apertures.

13. A display device as claimed in claim 12 in which at least one of the foreground replicas is provided with two projections and corresponding apertures are provided in the background replicas.

14. A display device as claimed in claim 12 in which the means on the foreground replicas for showing the foreground replicas from the background replicas include at least one thick projection on a rear surface of each foreground replica.

15. A display device as claimed in claim 14 in which the thickness of the projection is proportional to the size of the respective foreground replica.

* * * * *